(12) United States Patent
Strashny

(10) Patent No.: US 12,438,344 B2
(45) Date of Patent: Oct. 7, 2025

(54) SCALABLE AND PORTABLE AC/DC SUBSTATION

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 253 days.

(21) Appl. No.: 18/228,421

(22) Filed: Jul. 31, 2023

(65) Prior Publication Data
US 2025/0047079 A1  Feb. 6, 2025

(51) Int. Cl.
*H02B 1/52* (2006.01)
*H02J 3/38* (2006.01)
*H02J 9/06* (2006.01)

(52) U.S. Cl.
CPC ............ *H02B 1/52* (2013.01); *H02J 3/381* (2013.01); *H02J 9/061* (2013.01)

(58) Field of Classification Search
CPC .............. H02B 1/52; H02J 3/381; H02J 9/061
See application file for complete search history.

(56) References Cited

U.S. PATENT DOCUMENTS

| | | | |
|---|---|---|---|
| 3,796,941 A | 3/1974 | Danz et al. | |
| 7,881,078 B2 | 2/2011 | Pereira et al. | |
| 8,415,829 B2 * | 4/2013 | Di Cristofaro | H02B 7/06 307/39 |
| 8,427,814 B1 * | 4/2013 | Gonce | H02B 1/52 361/600 |
| 8,872,366 B2 | 10/2014 | Campion et al. | |
| 9,041,288 B2 | 5/2015 | Bader | |
| 9,172,221 B2 | 10/2015 | Terwiesch et al. | |
| 9,614,457 B2 | 4/2017 | Pan et al. | |
| 2014/0210213 A1 | 7/2014 | Campion et al. | |
| 2016/0013653 A1 | 1/2016 | Dorn et al. | |
| 2021/0273421 A1 | 9/2021 | McDermott | |

FOREIGN PATENT DOCUMENTS

| | | | |
|---|---|---|---|
| CN | 102275510 A | | 12/2011 |
| CN | 102593899 A | | 7/2012 |
| CN | 103378557 A | * | 10/2013 |
| CN | 203813281 U | * | 9/2014 |

(Continued)

OTHER PUBLICATIONS

Written Opinion and International Search Report for Int'l. Patent Appln. No. PCT/US2024/034419, mailed Oct. 7, 2024 (9pgs).

*Primary Examiner* — Robert J Hoffberg
(74) *Attorney, Agent, or Firm* — Lee & Hayes, PLLC

(57) ABSTRACT

A modular and scalable AC/DC substation transforms AC voltage to DC voltage for driving a high-voltage and high-current load, such as a heavy work machine. Sized to fit within a standard high-cube ISO shipping container, the substation includes a main transformer attached at a center of a rectangular base with a pair of controlled rectifiers positioned on the base downstream from the main transformer, aligned parallel to a lateral axis of the base, and substantially symmetrical to a longitudinal axis of the base. The arrangement of these components on the base, together with lowpass filters and switchgear, achieves high power density for the substation, provides balanced mass for stability during shipment and placement, and helps protect personnel from accidental electrical arcing.

20 Claims, 6 Drawing Sheets

(56) References Cited

FOREIGN PATENT DOCUMENTS

| | | | | |
|---|---|---|---|---|
| CN | 105162014 A | * | 12/2015 | ............. H02B 1/308 |
| CN | 205029226 U | * | 2/2016 | |
| CN | 205986303 U | * | 2/2017 | |
| CN | 104578833 B | | 6/2018 | |
| CN | 208630373 U | | 3/2019 | |
| CN | 109720220 A | | 5/2019 | |
| CN | 209217549 U | * | 8/2019 | |
| CN | 210149158 U | | 3/2020 | |
| CN | 216819405 U | | 6/2022 | |
| CN | 217984545 U | * | 12/2022 | |
| CN | 218558588 U | | 3/2023 | |
| CN | 117124968 A | * | 11/2023 | ................ H02J 9/04 |
| CN | 119029719 A | * | 11/2024 | ............. H02B 1/565 |
| JP | 2024106185 A | * | 8/2024 | |
| RU | 145940 U1 | * | 9/2014 | |
| WO | WO2021028041 A1 | | 2/2021 | |

* cited by examiner

SCALABLE AND PORTABLE AC/DC SUBSTATION

TECHNICAL FIELD

The present disclosure relates to a scalable and portable AC/DC substation for supplying high-voltage DC electrical power. More specifically, the present disclosure relates to a modular electrical substation for AC/DC power conversion having a transformer and controlled rectifiers configured to obtain high power density within a footprint of a standardized shipping container.

BACKGROUND

Heavy work machines, such as earth-moving vehicles or hauling trucks, require significant power to carry out their functions. The machines themselves can be of substantial weight, and their loads require large amounts of power to move. Diesel engines often provide that power. Electrical power has been used as a supplement to diesel power when delivered from wires over the haul route to a pantograph on the work machine as the machine moves. But overhead wires cannot reliably provide sufficient electrical energy to power a heavy work machine during long movements or to charge backup batteries for an electric machine at the same time. To replace the diesel power altogether, a power rail may provide high-voltage direct-current (DC) power to sliding contactors on the work machines as the machines move across a haul route.

The equipment transferring the DC power to a conductor such as a power rail for a heavy work machine often needs to be portable. A mine site, for instance, typically exists in a remote and rugged environment with access only to alternating current (AC) voltage from high-voltage distribution lines. As a result, equipment to transform and convert the high-voltage AC power to lower voltage DC power usable by the work machines must be shipped to the work site to form a power installation, or electrical substation. As the mining, logging, or other activity at the site evolves, the substation may need to be relocated. Substations that are site specific and involve high-voltage and high-current cables can require complex commissioning and decommissioning when relocation is required.

Electrical substations also need to prevent accidental arcing between high-voltage equipment and personnel. Modular substations for remote locations typically contain electrical equipment, such as switchgear and transformers, aligned in a planar configuration along a rear wall of a rectangular structure. A corridor extends along a front wall of the substation, from which personnel can access the equipment and be subjected to electrical arcing during operation. The arrangement also focuses the heavy electrical equipment along one section of the substation, resulting in a structure that is unstable and difficult to transport.

One arrangement for a portable, containerized substation for deployment in remote locations is described in U.S. Pat. No. 8,872,366 ("the '366 patent"). The '366 patent describes a modular and scalable power plant to generate and distribute electrical power at a disaster site. A substation module within the power plant contains two transformers mounted on opposite ends of the substation with gas-insulated cubicles positioned between the transformers and along a back wall of the substation. Personnel can access the gas-insulated cubicles from a controller room located in the middle portion of the substation. Among other things, the substation of the '366 patent, directed to AC power distribution, does not fit equipment required to generate DC power, and its equipment presents risks of arcing to personnel within the controller room. As a result, the substation of the '366 patent is not desirable as a portable substation for transferring high-voltage DC power.

Examples of the present disclosure are directed to overcoming deficiencies of such systems.

SUMMARY

In an aspect of the present disclosure, a system for transferring electrical energy as DC voltage includes a modular substation, configured to receive an AC input and to deliver a DC voltage output, and a conductive rail, electrically coupled to the modular substation and configured to transfer the DC voltage output to a load connected to the conductive rail. The modular substation includes a base having a substantially planar and rectangular shape, with a top surface extending longitudinally from a first end to a second end and laterally from a front side to a rear side. A longitudinal axis extends along the top surface substantially centered between the front side and the rear side, and a lateral axis extends along the top surface substantially centered between the first end and the second end. The substation includes AC voltage switchgear configured to receive the AC voltage input from an external source and an auxiliary transformer configured to be electrically coupled to the AC voltage switchgear. The auxiliary transformer and the AC voltage switchgear are aligned on the top surface of the base substantially parallel to the lateral axis and between the lateral axis and the first end. The substation further includes a main transformer positioned substantially at an intersection of the longitudinal axis and the lateral axis and having primary windings, electrically coupled to the AC voltage switchgear, and secondary windings. A pair of controlled rectifiers are electrically coupled to at least the secondary windings of the main transformer and are configured to generate the DC voltage output. The pair of controlled rectifiers are aligned on the base substantially parallel to the lateral axis and between the main transformer and the second end. One or more lowpass filters are electrically coupled to the pair of controlled rectifiers and are positioned substantially parallel to the lateral axis and symmetrical about the longitudinal axis between the pair of controlled rectifiers and the second end. The substation also includes DC voltage switchgear electrically coupled to the one or more lowpass filters and configured to receive the DC voltage output from the one or more lowpass filters. The DC voltage switchgear is positioned proximate to the second end of the base, substantially parallel to the lateral axis, and symmetrical about the longitudinal axis.

In another aspect of the present disclosure, a portable electrical substation includes a rectangular platform having a top surface with a geometric center between an upstream end and a downstream end and between a first side and a second side. A longitudinal axis passes through the geometric center and along the top surface substantially parallel to the first side and the second side, and a lateral axis passes through the geometric center and along the top surface substantially parallel to the upstream end and the downstream end. The substation includes a primary high-voltage transformer attached to the top surface symmetrical about the longitudinal axis and symmetrical about the lateral axis, and AC voltage switchgear attached to the top surface upstream from the primary high-voltage transformer and substantially parallel to the lateral axis. A pair of controlled rectifiers is attached to the top surface downstream from the primary high-voltage transformer and aligned together substantially parallel to the lateral axis. One or more lowpass filters are attached to the top surface downstream from the pair of controlled rectifiers and symmetrical about the longitudinal axis. The substation further includes DC voltage switchgear attached to the top surface proximate the downstream end, substantially parallel to the lateral axis, and symmetrical about the longitudinal axis.

In yet another aspect of the present disclosure, a method of assembling a portable electrical substation includes providing a rectangular platform having a geometric center between an upstream end and a downstream end and between a first side and a second side and assembling electrical equipment for converting AC power to lower voltage DC power onto the rectangular platform. A longitudinal axis passes through the geometric center and substantially parallel to the first side and the second side, and a lateral axis passes through the geometric center and substantially parallel to the upstream end and the downstream end. The method includes, in any order, attaching a primary high-voltage transformer symmetrical about the longitudinal axis and symmetrical about the lateral axis, attaching AC voltage switchgear upstream from the primary high-voltage transformer substantially parallel to the lateral axis, attaching a pair of controlled rectifiers downstream from the primary high-voltage transformer, attaching one or more lowpass filters downstream from the pair of controlled rectifiers and symmetrical about the longitudinal axis, and attaching DC voltage switchgear proximate the downstream end, substantially parallel to the lateral axis, and symmetrical about the longitudinal axis.

BRIEF DESCRIPTION OF DRAWINGS

The detailed description references the accompanying figures. In the figures, the left-most digit of a reference number identifies the figure in which the reference number first appears. The same reference numbers indicate similar or identical items.

DETAILED DESCRIPTION

Consistent with the principles of the present disclosure, a modular and scalable AC/DC substation transforms AC voltage to DC voltage for driving a high-voltage and high-current load, such as a heavy work machine. The heavy work machine may be, in some examples, a large electrical haul truck configured to move payloads within a worksite such as a surface mine. Sized to fit within a shipping containing conforming dimensionally to a standard ISO shipping container, the substation includes a rectangular platform or base, four walls, and an optional roof. On the rectangular platform, a main transformer is attached substantially at a geometric center where a longitudinal axis and a lateral axis intersect. AC switchgear that receives and switches AC voltage from an external source is located on the platform upstream from the main transformer, while a pair of controlled rectifiers are positioned downstream from the main transformer. The rectifiers are aligned parallel to the lateral axis and substantially symmetrical to the longitudinal axis. Lowpass filters and DC switchgear are likewise attached to the platform downstream from the rectifiers and positioned symmetrical to the longitudinal axis. The arrangement of these components on the base, particularly when receiving medium-voltage AC input in the range of 11-33 kVAC and generating DC output in the range of +/−1500 VDC, achieves high power density for the substation, provides balanced mass for stability of the substation during shipment and placement, and helps protect personnel from accidental electrical arcing. The following describes several examples for carrying out the principles of this disclosure.

Figure 1:
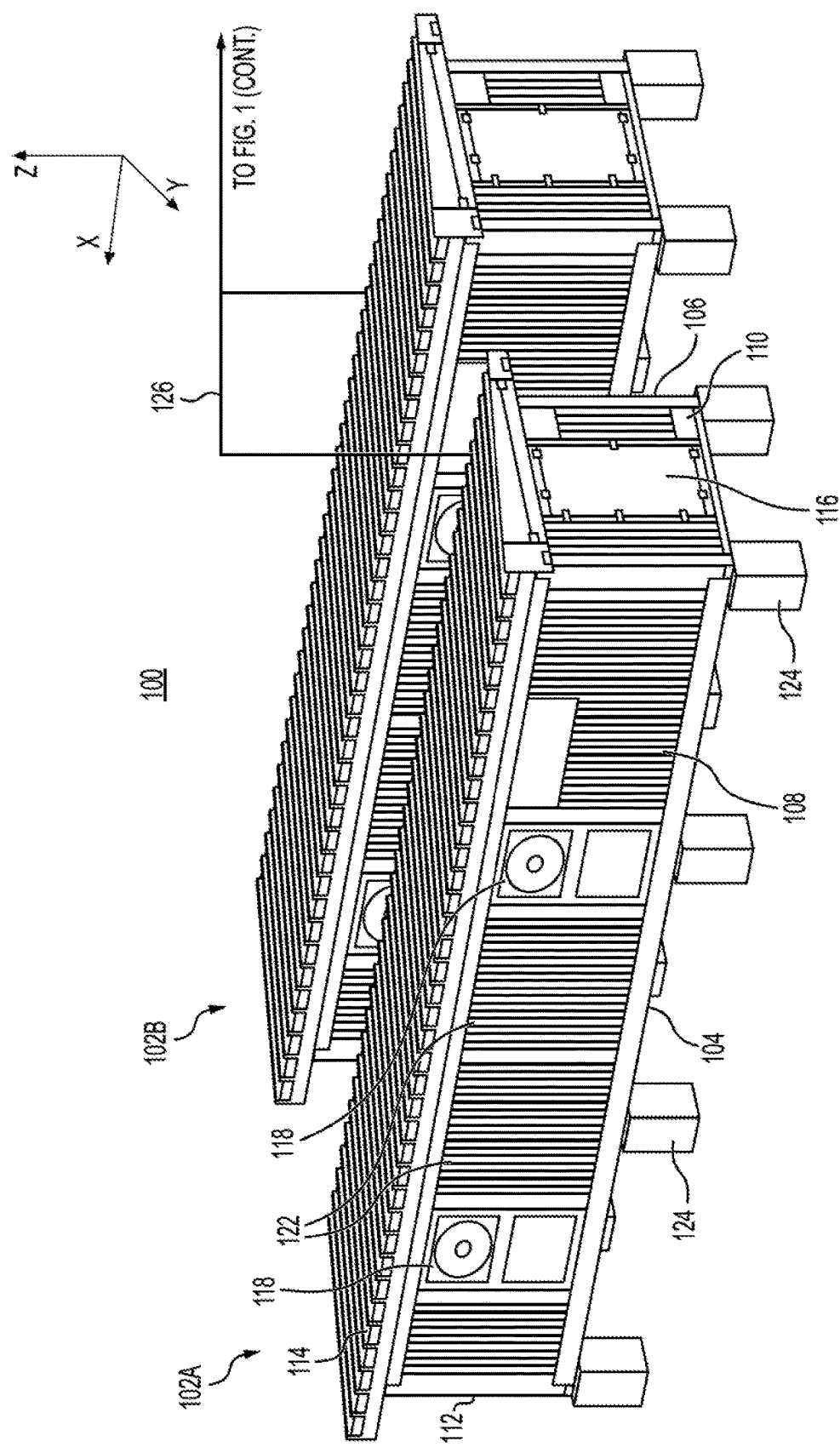
FIG. 1 is an isometric view of a generalized system for transferring electrical energy as DC voltage in accordance with an example of the present disclosure.
Figure 1:
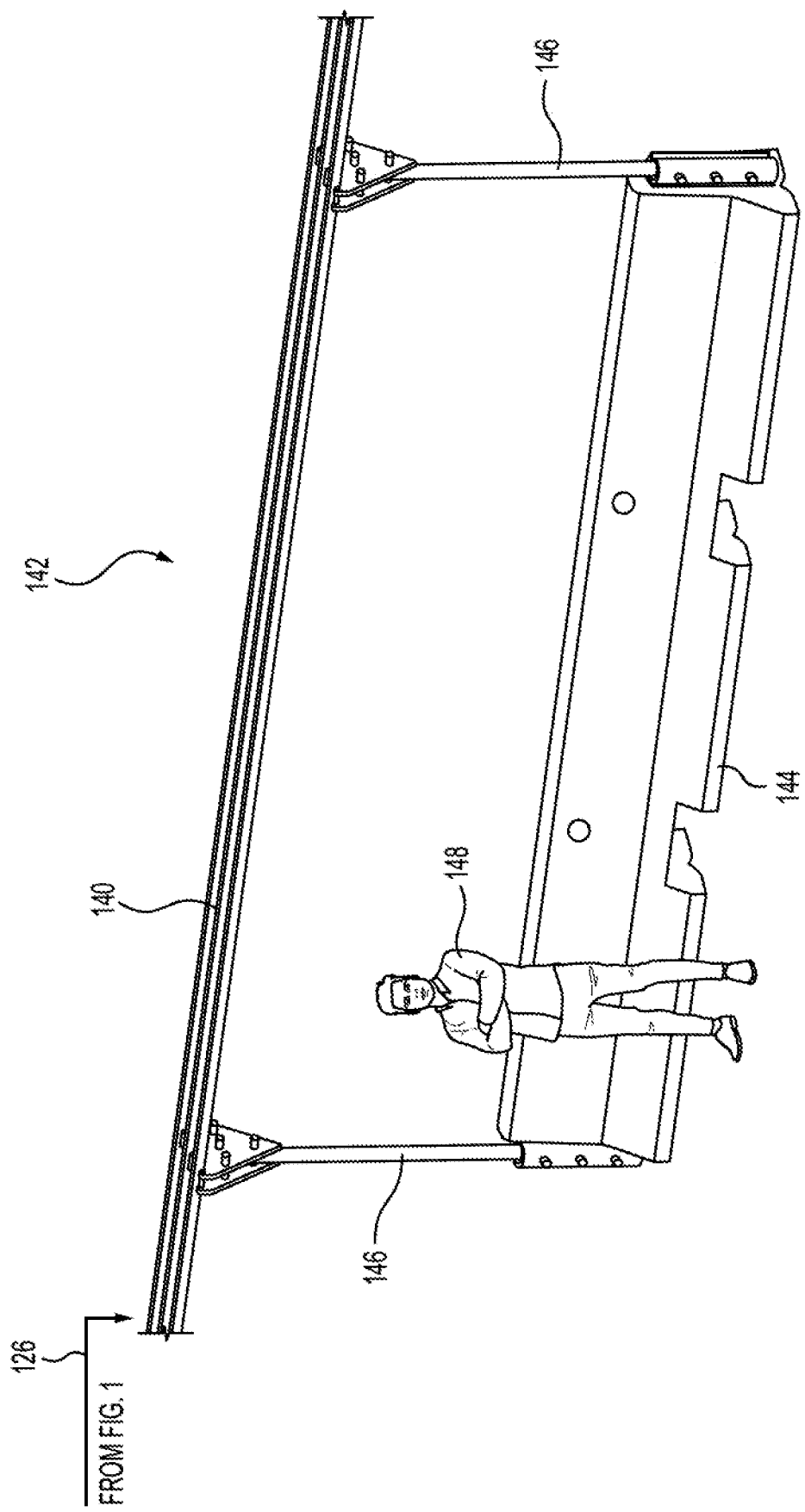

FIG. 1 is an isometric view of a generalized system 100 for transferring electrical energy as DC voltage within an XYZ coordinate system as one example suitable for carrying out the principles discussed in the present disclosure. As illustrated in FIG. 1, system 100 generally includes one or more electrical substations 102, such as substation 102A and substation 102B, and a conductive path such as conduction rails 140. The electrical substations receive AC voltage from an external source (not shown), such as AC distribution power, and transform and condition that AC voltage into a DC voltage. The converted DC voltage is then provided for distribution along conduction rails 140 for use by a load (not shown), such as a heavy work machine.

System 100 may be located in any environment requiring DC distribution voltage, particularly situations in which substations 102, possibly as well as conduction rails 140, may be periodically commissioned, decommissioned, and relocated. Substations 102 are essentially self-contained and suited for environments where electrical equipment and related resources may otherwise be lacking. In some examples, the environment for system 100 is a mine site or a logging site in a remote location, and the load is a work machine powered by the DC voltage on conduction rails 140 to haul a load. In other implementations, the heavy work machine need not haul a load and may be any machine associated with various industrial applications including, but not limited to, mining, agriculture, forestry, construction, and other industrial applications.

As illustrated in FIG. 1, substations 102 are each cuboid in shape, although other forms for substations 102 are possible depending on the implementation. Referring to substation 102A, the exterior structure includes a base 104, front wall 106, rear wall 108, first end wall 110, second end wall 112, and roof 114. One or more doors within the walls of substation 102A provide access to the interior of the structure, such as end door 116 within first end wall 110. Due to heat generated by electrical equipment within substation 102A described below, several air-conditioning units 118 cool the interior and may form part of one or more walls, as with rear wall 108 in FIG. 1. Otherwise, panels 122 form an exterior structure within the walls to conceal and prevent access to the interior. In some examples, substations 102 are elevated from ground by support structures, indicated in FIG. 1 as blocks or piers 124. Piers 124 may be of any shape or composition and serve to hold the substations 102 above the ground. In some examples, piers 124 are about 1.0 meter in height and help inhibit access into substations 102 in a manner discussed further below.

In some examples, substation 102A and substation 102B are modular and portable structures having substantially the same structure and composition. To facilitate shipment, substations 102 are each intended to have an external size sufficient when assembled to fit within, i.e., to conform to the internal dimensions of, a shipping container of standard size. In one example, a Series 1AAA standard "high cube" intermodal shipping container according to International Organization for Standardization (ISO) standard 668:2020, has a length of 40 feet (12.19 meters), a width of eight feet (2.44 meters), and a height of 9.6 feet (2.5 meters). As a result, substations 102 may each be loaded in one example into a shipping container conforming to ISO 668:2020, shipped to a location within a work site, unloaded, and configured for operation with minimal additional parts or setup activities. Similarly, substations 102 may be decommissioned from the location and readily moved intact to a new destination, such as another location within the site as work evolves. Shipping containers of other sizes and standards are also possible for transporting substations 102 based on the size and electrical performance of the equipment and the logistics of moving substations 102 between locations.

In addition to being modular, the substations 102 within system 100 are scalable. As such, substation 102A and substation 102B may be connected or disconnected electrically to alter the power capacity deliverable to conduction rails 140. In some examples, each of the substations 102 receives an AC voltage input generally in the range of 11.0 kV to 33 kV three-phase AC electricity at 50 Hz or 60 Hz from an external source such as an AC medium-voltage distribution line. Each of the substations 102 may then transform and convert the AC voltage input to a DC voltage output of up to +/−1500 VDC, nominally +/−1400 VDC, at about 7.5-10 MW of power. It should be noted that the AC voltage input ranges and/or the DC voltage output ranges are examples, and the present disclosure contemplates other suitable values of the AC voltage input and/or the DC voltage output.

If desired for an implementation, multiple substations 102 can be combined together modularly in the field via connection 126 to generate a higher level of output power. Combining via connection 126 may involve coupling DC switchgear described below at an output of each substation. For instance, substation 102A and substation 102B may be electrically paired as shown in FIG. 1 via connection 126 to provide 15 MW of power (2×7.5 MW) at +/−1500 VDC for driving a load on conduction rails 140. Similarly, two other substations 102 (not shown) could be combined with substation 102A and substation 102B to result in 30 MW of DC electrical power (4×7.5 MW). It should be understood that the voltages and powers described are merely exemplary, as various levels of AC voltage may be used, as well as a combination of AC and DC voltages, depending on the particular configuration. Further, other variations are available in implementing this modular design and will be known to those of ordinary skill in the art.

Returning to FIG. 1, conduction rails 140 are illustrated as being based on the ground to provide DC electrical power from the substations 102 to a load (not shown), such as a heavy work machine. As generally embodied in FIG. 1, conduction rails 140 are mounted as part of a rail support module 142 as an example of a support assembly for securely positioning conduction rails 140 along a side of a haul route. When implemented for an overall transportation route, such as within a mining site, rail support module 142 would be one component within a series or chain of structures providing mechanical stability to conduction rails 140 along a path for conduction of electrical power. The rail support module 142 may generally include a barrier 144 as a foundation to retain support poles 146, which hold and insulate conduction rails 140 in an elevated position. In one example, barrier 144 is made primarily of concrete with reinforcing steel bars (not shown) set within the concrete to enhance solidity of barrier 144, although other designs are feasible. The person 148 in FIG. 1 depicts a relative height of conduction rails 140 enabled by support poles 146. By elevating conduction rails 140 above the typical reach of person 148, support poles 146 help improve safety for the delivery of electrical power from substations 102 in system 100.

In some examples, conduction rails 140 have two or more conductors, each providing voltage and current at a different electrical pole. In an implementation in which conduction rails 140 include three conductors, one conductor provides positive DC voltage, a second conductor provides negative DC voltage, and a third conductor provides 0 volts relative to the other two conductors. In some examples, the two powered conductors within conduction rails 140 provide +1500 VDC and −1500 VDC as received from substations 102. A heavy work machine may generate traction by accessing the DC electrical power, for example, through a contactor configured to maintain an electrical connection with conduction rails 140 while sliding along their surface as the work machine moves.

Figure 2:
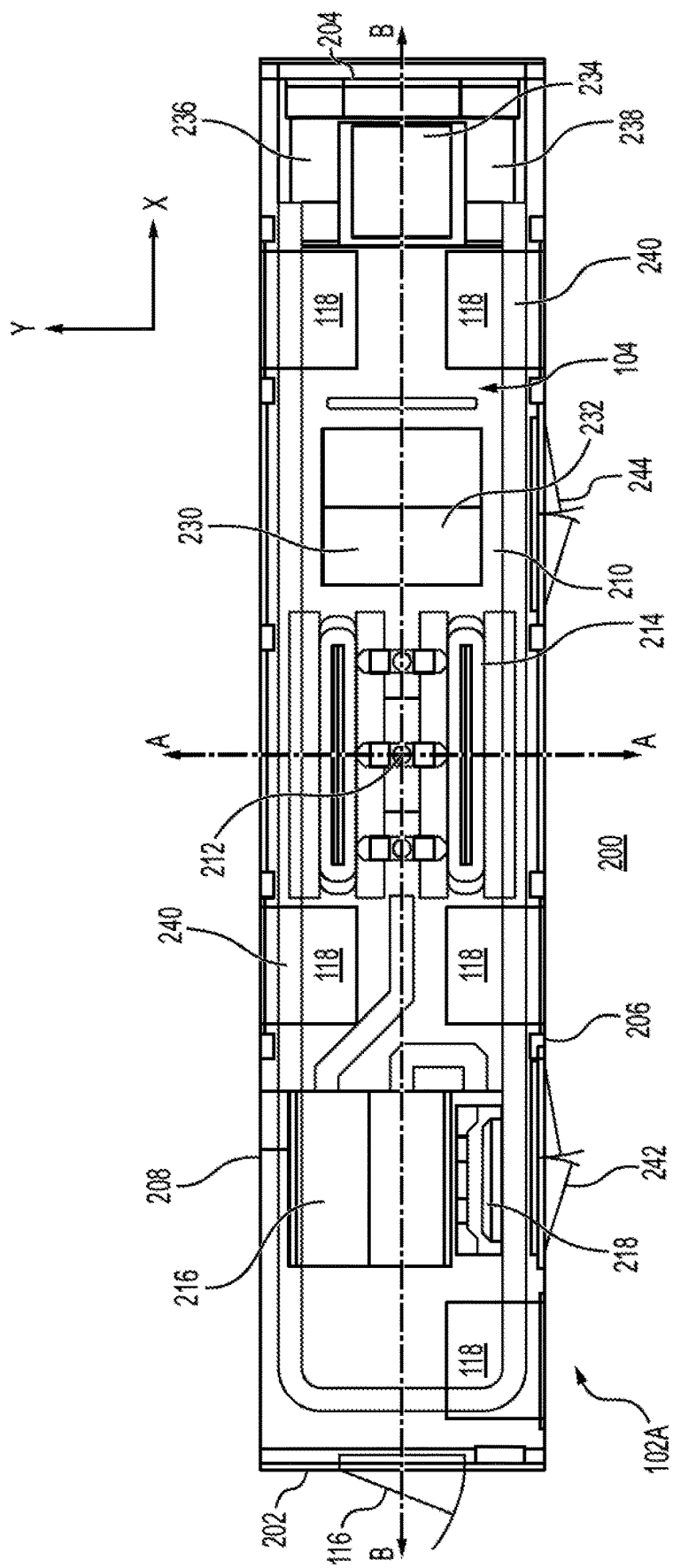
FIG. 2 is a top view of a portable electrical substation in FIG. 1 in accordance with an example of the present disclosure.

While FIG. 1 illustrates a general arrangement for substations 102 within a system 100 for transferring electrical energy as DC voltage to conduction rails 140, FIGS. 2-5 illustrate different perspectives and components for representative substation 102A. FIG. 2 is a top view of substation 102A showing a floor plan in one configuration consistent with the principles of the present disclosure. Accordingly, FIG. 2 shows an arrangement of electrical components within substation 102A on base 104, which also may be termed a floor, platform, support, or other planar horizontal surface at a bottom of the substation.

The base 104 has a substantially rectangular shape with two parallel sides and two parallel ends shorter in length than the parallel sides. Namely, at the left in FIG. 2, base 104 has first or upstream end 202. As will be apparent in the discussion below, components are typically arranged on base 104 from left to right in the direction of current flow through substation 102A, such that the left end of base 104 may be termed upstream end 202. Upstream end 202 is joined directly or indirectly to first end wall 110 (FIG. 1). Opposite upstream end 202, downstream end 204 of base 104 is joined directly or indirectly to second end wall 112. These lateral ends join with two longer, or longitudinal, sides at the top and bottom of top view 200. Specifically, front side 206 and rear side 208 join directly or indirectly with front wall 106 and rear wall 108, respectively. For purposes of orientation, a lateral axis A-A is shown in FIG. 2 running along a top surface 210 of base 104 equidistant between upstream end 202 and downstream end 204, while a longitudinal axis B-B extends along top surface 210 equidistant between front side 206 and rear side 208. Lateral axis A-A and longitudinal axis B-B intersect at a point corresponding essentially to a geometric center 212 of base 104.

As depicted in FIG. 2, a main transformer 214 is positioned at center 212 of base 104. In some examples, main transformer 214 is located to be symmetrical about the longitudinal axis and symmetrical about the lateral axis. Stated differently, in some examples, main transformer 214 is equidistant between upstream end 202 and downstream end 204 and equidistant between front side 206 and rear side 208. In some examples, main transformer 214 may include more than one transformer operating together electrically and positioned together as a common unit about center 212. The main transformer 214 can have substantial weight compared with other components on base 104, and positioning main transformer 214 at or near center 212 can balance the mass in substation 102A for shipment and placement of the substation, as discussed in more detail below.

In the example of FIG. 2, main transformer 214 is a step-down transformer having primary windings for receiving three-phase AC voltages at various primary taps ranging from, for example, 11 kV to 33 kV and having secondary windings for producing corresponding three-phase AC voltages at various secondary taps. In one example, main transformer 214 is configured to generate 1.2 kVAC at each of its secondary windings at a continuous power rating of 6.5 MVA, generally operable at a power capability of about 7.5-10 MW. Main transformer 214 may be a cast resin dry-type three-phase transformer having a mass of 8-10 metric tons as one option. Dimensionally, main transformer 214 may generally have a length of about 2-3 meters, a width of 1-2 meters, and a height of about 2-3 meters. To prevent movement of main transformer 214 during shifting of substation 102A, such as during shipment, commissioning, or decommissioning of the substation, main transformer 214 may be secured to top surface 210 of base 104 using bolts or other attachment devices.

Upstream from main transformer 214, i.e., to the left in FIG. 2, AC switchgear 216 and an auxiliary transformer 218 are positioned. The AC switchgear 216 contains a collection of components configured for receiving, disconnecting, and otherwise switching lines with AC input voltage received from an external source, such as AC distribution lines proximate to substation 102A. AC switchgear 216 provides input-side protection for the system and personnel, for example, to detect against ground faults detected on the AC voltage side, to react to a potential transformer overtemperature condition, and to perform other detections and deenergizing of components at the AC input portion of the substation. Thus, AC switchgear 216 may include a number of safety and relay mechanisms, such as three-phase disconnect switches and/or one or more three-phase AC circuit breakers located electrically between an AC voltage source and main transformer 214. When substation 102A is operating, AC switchgear 216 provides a closed electrical path for providing the AC voltage from an external source to primary windings of main transformer 214.

The auxiliary transformer 218 is a three-phase AC transformer also electrically coupled to AC switchgear 216 and configured to provide electrical power to equipment and devices within the substation secondary to the conversion of AC input voltage to DC output voltage. For example, the auxiliary transformer 218 may provide power for lights, a control system, circulation fans, and other electrical components within the substation. In some examples, auxiliary transformer 218 is a 100 kVA three-phase AC transformer. As illustrated in FIG. 2, AC switchgear 216 and auxiliary transformer 218 are situated on top surface 210 substantially parallel to lateral axis A-A and between the lateral axis A-A and upstream end 202. While AC switchgear 216 may be significantly wider laterally (i.e., along the lateral axis A-A) than auxiliary transformer 218, in some examples, AC switchgear 216 and auxiliary transformer 218 may be arranged such that they are as a pair positioned equidistant between front side 206 and rear side 208. To prevent movement of AC switchgear 216 and auxiliary transformer 218 during shifting of substation 102A, such as during shipment, commissioning, or decommissioning of the substation, AC switchgear 216 and auxiliary transformer 218 may be secured to top surface 210 of base 104 using bolts or other attachment devices.

Downstream from main transformer 214, i.e., to the right in FIG. 2, are a pair of controlled rectifiers labeled as first controlled rectifier 230) and second controlled rectifier 232. Each of the controlled rectifiers is electrically coupled to at least the secondary windings of main transformer 214 and is configured to generate a DC voltage output through rectification. In some examples, first controlled rectifier 230 and second controlled rectifier 232 are six-pulse thyristor rectifier units, which can provide improved voltage regulation compared with diode rectifiers, have AC and DC fault current limiting, and provide the ability to be operated in parallel. Accordingly, first controlled rectifier 230 is configured to provide rectification to generate one polarity of DC voltage, e.g., +DC volts, while second controlled rectifier 232 is configured to provide rectification to generate the opposite polarity of DC voltage, e.g., DC volts. While other types of controlled rectifiers are possible, such as IGBT (insulated-gate bipolar transistor) rectifier units, thyristor rectifier units have higher efficiencies and lower thermal losses, which provide advantages for accomplishing high power density within condensed packaging as in substations 102 when operating at elevated input voltages such as 33 kVAC with DC voltage conversion. Specifically, operating more efficiently than other types of controlled rectifiers, thyristor rectifier units will require less cooling equipment within the substation, providing space on base 104 for other equipment and enhancing the overall power density for the substation. Other approaches for controlling the rectifiers besides or in addition to thyristors may be employed with the goal of maximizing efficiency and, therefore, decreasing the cooling needs for the substation.

In some examples, first controlled rectifier 230 and second controlled rectifier 232 are aligned on top surface 210 of base 104 substantially parallel to the lateral axis A-A and between main transformer 214 and downstream end 204. More particularly, first controlled rectifier 230 and second controlled rectifier 232 as a pair may be positioned symmetrically about longitudinal axis B-B, or equidistant between front side 206 and rear side 208. As with other components on top surface 210, first controlled rectifier 230) and second controlled rectifier 232 may be secured to top surface 210 using bolts or other attachment devices to prevent movement during shifting of substation 102A.

Downstream from first controlled rectifier 230 and second controlled rectifier 232 in the floor plan of substation 102A are one or more lowpass filters 234 along with first DC switchgear 236 and second DC switchgear 238. In some examples, such as shown in FIG. 2, lowpass filters 234 are positioned substantially symmetrical about the longitudinal axis. The first DC switchgear 236 and second DC switchgear 238 are located on opposite lateral sides of lowpass filters 234, substantially parallel to the lateral axis and symmetrical about the longitudinal axis. Thus, in the example of FIG. 2, first DC switchgear 234 handles positive polarity DC voltage, while second DC switchgear 238 handles negative polarity DC voltage. The lowpass filters 234 may be inductor-capacitor filters and include, among other components, a comparatively large inductance and a smaller capacitance configured to remove ripple voltage remaining on the DC voltage generated by first controlled rectifier 230) and second controlled rectifier 232. The ripple voltage may be higher for rectifiers implemented with thyristors rather than for diode rectifiers. In some examples, the lowpass filters 234 may have an inductance in the range of 600 μH and a capacitance in the range of 10 μF. To help enhance power density for the substation, lowpass filters 234 may include air-core inductors. Air-core inductors tend to be large in size compared with cored inductors, but air-core inductors have a significantly higher efficiency and therefore lower cooling requirements. Therefore, as with the use of thyristor-controlled rectifiers as discussed above, the use of air-core inductors may enable fewer or smaller air-conditioning units 118 within the substation, providing room on base 104 to fit other equipment for handling the input voltages in a range of 11-33 kVAC and DC conversion within the confined space of a standard shipping container. The lowpass filters 234, first DC switchgear 236, and second DC switchgear 238 may be secured to top surface 210 using bolts or other attachment devices to prevent movement during shifting of substation 102A.

The first DC switchgear 236 and second DC switchgear 238 include electrical components configured for receiving, disconnecting, outputting, and otherwise switching lines with DC input voltage received from first controlled rectifier 230 and second controlled rectifier 232, respectively. The components within the DC switchgear can include fast DC circuit breakers, such as those often used in the rail industry. With first DC switchgear 236 and second DC switchgear 238 handling different polarities from first controlled rectifier 230 and second controlled rectifier 232, first DC switchgear 236 can provide output voltage of approximately +1500 VDC for connection 126 to provide to one of the three lines in conduction rails 140 in some examples. Likewise, second DC switchgear 238 can provide output voltage of approximately -1500 VDC for connection 126 to provide to another of the three lines in conduction rails 140 for a total output of about 3000 VDC at about 7.5-10 MW. Accordingly, substation 102A can provide up to +/-1500 VDC in a mode operating as a voltage source in a traction mode for driving a load such as a heavy work machine on conductor rails 140.

Due to the heat generated by the electrical components within substation 102A, particularly by main transformer 214, several air-conditioning units 118 are positioned on top surface 210 of base 104. The air-conditioning units 118 are located to provide balanced conditioning of air within substation 102A as well as to help distribute weight evenly for more stable movement of the substation during shipping and deployment. As shown in the example of FIG. 2, two air-conditioning units 118 are located adjacent to and upstream from main transformer 214, on opposite sides of longitudinal axis B-B, and proximate front side 206 and rear side 208, respectively. Similarly, two other air-conditioning units 118 are located adjacent to and upstream from lowpass filters 234, on opposite sides of longitudinal axis B-B, and proximate front side 206 and rear side 208, respectively. In the example of FIG. 2, a fifth one of the air-conditioning units 118 is located along front side 206 upstream from auxiliary transformer 218. The air-conditioning units 118 may be implemented as any type of unit suitable for the implementation and, based on the selection of electrical components to maximize thermal efficiency as discussed above, air-conditioning units 118 may be minimized in number, size, and capacity. In some examples, air-conditioning units 118 have a capacity of 25 kW. While air-conditioning units 118 may also be fixed to base 104, the units need external evacuation for air and may therefore be secured to the respective side walls where they are installed, such as rear wall 108 as shown in FIG. 1. Although not depicted in the figures, the substation may also include one or more a positive air pressurizers to create small pressure differential between the inside of the substation and the ambient atmosphere. The positive air pressurizers may help prevent dust and moisture from entering the container depending on the conditions in which the substation may operate. The positive air pressurizers may be positioned within the substation as space warrants or they may be attached to the exterior of the substation following commissioning.

To electrically connect the various components within substation 102A, cabling 240 spans the length of the structure. Cabling 240 may be low-gauge cables with conductors made of copper, aluminum, or similar material configured for handling medium to high voltages and high currents. As will be appreciated, the arrangement of components on base 104 according to the footprint of FIG. 2 enables short and efficient electrical connections. For example, compared with a typical arrangement of the electrical equipment in a planar configuration along rear side 208, the balanced arrangement of equipment centered along lateral axis A-A and longitudinal axis B-B enables main transformer 214 to be more directly connected to first controlled rectifier 230 and second controlled rectifier 232. Shortening the lengths of spans for cabling 240 and keeping parallel connections of the same length can improve the electrical performance of substation 102A and decrease losses, such as due to detrimental parasitic events from unequal lengths of parallel cabling.

In some examples, or at least in some spans for short and direct connections within a substation, cabling 240 may include one or more busbars. Busbars may be used, for instance, to make a straight connection for positive polarity from secondary windings of main transformer 214 to first controlled rectifier 230 and for negative polarity to second controlled rectifier 232, with each set of busbars having the same length due to the side-by-side positioning of the controlled rectifiers about longitudinal axis B-B. With the rectifiers positioned end-to-end along rear side 208 as in typical substation layouts, cabling 240 to the different rectifiers would require different lengths. Similar efficiencies for cabling 240 exist in FIG. 2 for connecting the controlled rectifiers with lowpass filters 234 and then first DC switchgear 236 and second DC switchgear 238.

Finally, FIG. 2 depicts several doors for accessing the interior of substation 102A. In addition to end door 116 shown in FIG. 1, FIG. 2 shows first side door 242 and second side door 244 positioned within front wall 106. While the doors provide access within substation 102A, the ability for personnel to enter or move within substation 102A may be restricted for safety reasons, in a manner described further below.

Figure 3:
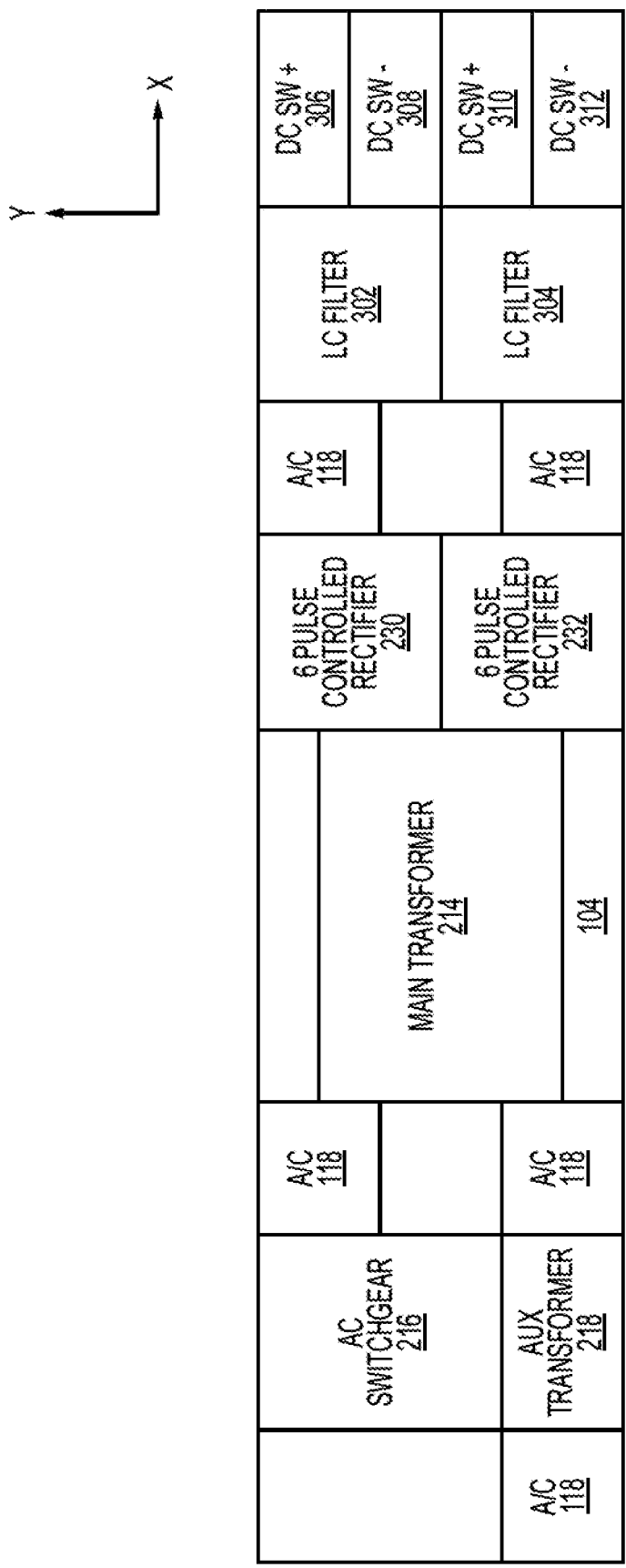
FIG. 3 is a schematic block diagram of an alternative floor plan of the portable electrical substation in FIG. 2 in accordance with an example of the present disclosure.

While FIG. 2 illustrates one arrangement for substation 102A, FIG. 3 depicts an alternative floor plan with respect to the equipment downstream from first controlled rectifier 230 and second controlled rectifier 232. FIG. 3 is a generalized schematic block diagram 300 of the layout for components on base 104 in a variation of top view 200. Differences from top view 200 in FIG. 3 exist at the right side of base 104 downstream from main transformer 214 with respect to the lowpass filters and the DC switchgear. In short, while top view 200 in FIG. 2 depicts the layout of a substation generally configured to operate as a voltage source for providing traction to heavy work machines, schematic block diagram 300 provides a substation that may also be configured to function as a current source to charge batteries for heavy work machines by providing two outputs each of +/−1500 VDC and 3 MW rather than one output of 3000 VDC at 7.5-10 MW. Thus, the substation of FIG. 3 can be configured to provide any of at least four modes of operation: 1×3000 VDC as a voltage source in a traction mode: 1×1500 VDC as a voltage source in a traction mode: 1×3000 VDC as a current source in a bulk charger mode; and 2×1500 VDC as a current source in a bulk charger mode. In other cases, the two outputs may provide +/−750 VDC, +/−3000 VDC, and other DC output classes as desired through reconfiguration.

In FIG. 3, one difference exists with the substation of FIG. 2 in that the lowpass filters are enlarged. This enlargement arises in the attempt to obtain higher fidelity of the output voltage for operating as a current source in a bulk charger mode. In this charging mode, the output current needs to be controlled sufficiently with more substantial filtering to provide charging capacity on the load, e.g., a heavy work machine containing batteries on-board. In contrast, for a substation operating solely as a voltage source in a traction mode, such as in FIG. 2, the voltage output is maintained as a constant setpoint and the lowpass filters can be smaller. In one example, the lowpass filters of FIG. 3 have an inductance of about 6 mH and a capacitance of about 10 µF. As discussed above for FIG. 2, the use of air-core inductors for first lowpass filter 302 and second lowpass filter 304 leads to higher efficiency and lower heat dissipation than with cored inductors, reducing the need for additional cooling units within the substation.

In addition, the lowpass filters in FIG. 3 are separated between positive and negative polarity. As a result, first lowpass filter 302 is coupled to first controlled rectifier 230, while second lowpass filter 304 is coupled to second controlled rectifier 232. Due to the increased size of the filters, first lowpass filter 302 and second lowpass filter 304 are positioned between the controlled rectifiers and the DC switchgear, i.e., upstream from the DC switchgear, rather than being aligned together with the DC switchgear as in top view 200. The DC switchgear is also expanded to have positive and negative switchgear for each half of the output. Thus, first positive DC switchgear 306 and first negative DC switchgear 308 are electrically coupled to first lowpass filter 302, while second positive DC switchgear 310 and second negative DC switchgear 312 are electrically coupled to second lowpass filter 304. As shown in FIG. 3, schematic block diagram 300 provides two separate outputs from each of the first DC switchgear and the second DC switchgear.

Among other features, the footprints of base 104 as illustrated in FIG. 2 and FIG. 3 provide increased power density arising from the arrangement of electrical components within the fixed space, enhanced shipment efficiency by fitting within a standardized and commoditized container, and balanced distribution of weight laterally and longitudinally for substation 102A. Accordingly, substation 102A may efficiently be packaged and shipped to a remote location, such as by lifting by a crane and loading into a container conforming to the dimensions of an ISO high-cube shipping container. At the destination, substation 102A is essentially ready for operation without the need to configure extraneous equipment or to expand the substation beyond the footprint of base 104. Moreover, as explained below, the arrangement of equipment away from a planar configuration along a wall, such as front side 206 or rear side 208, also leads to substation 102A being safer for operators in avoiding accidental arcing.

Figure 5:
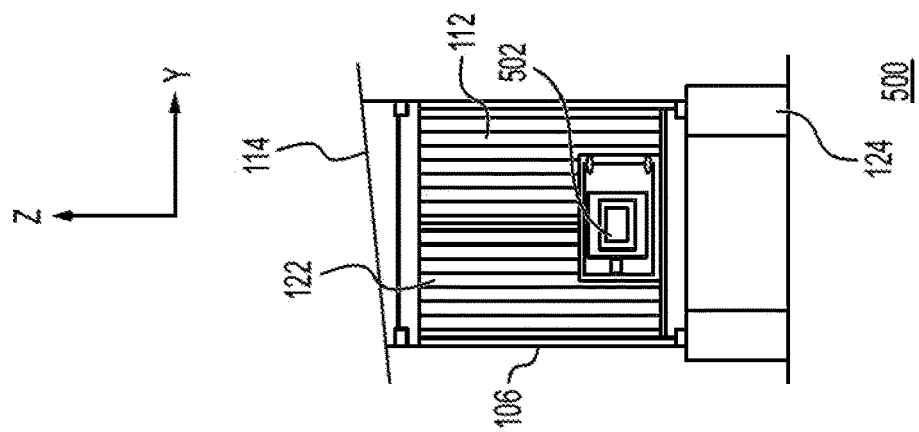
FIG. 5 is a right-side view of the portable electrical substation of FIG. 1 in accordance with an example of the present disclosure.
Figure 4:
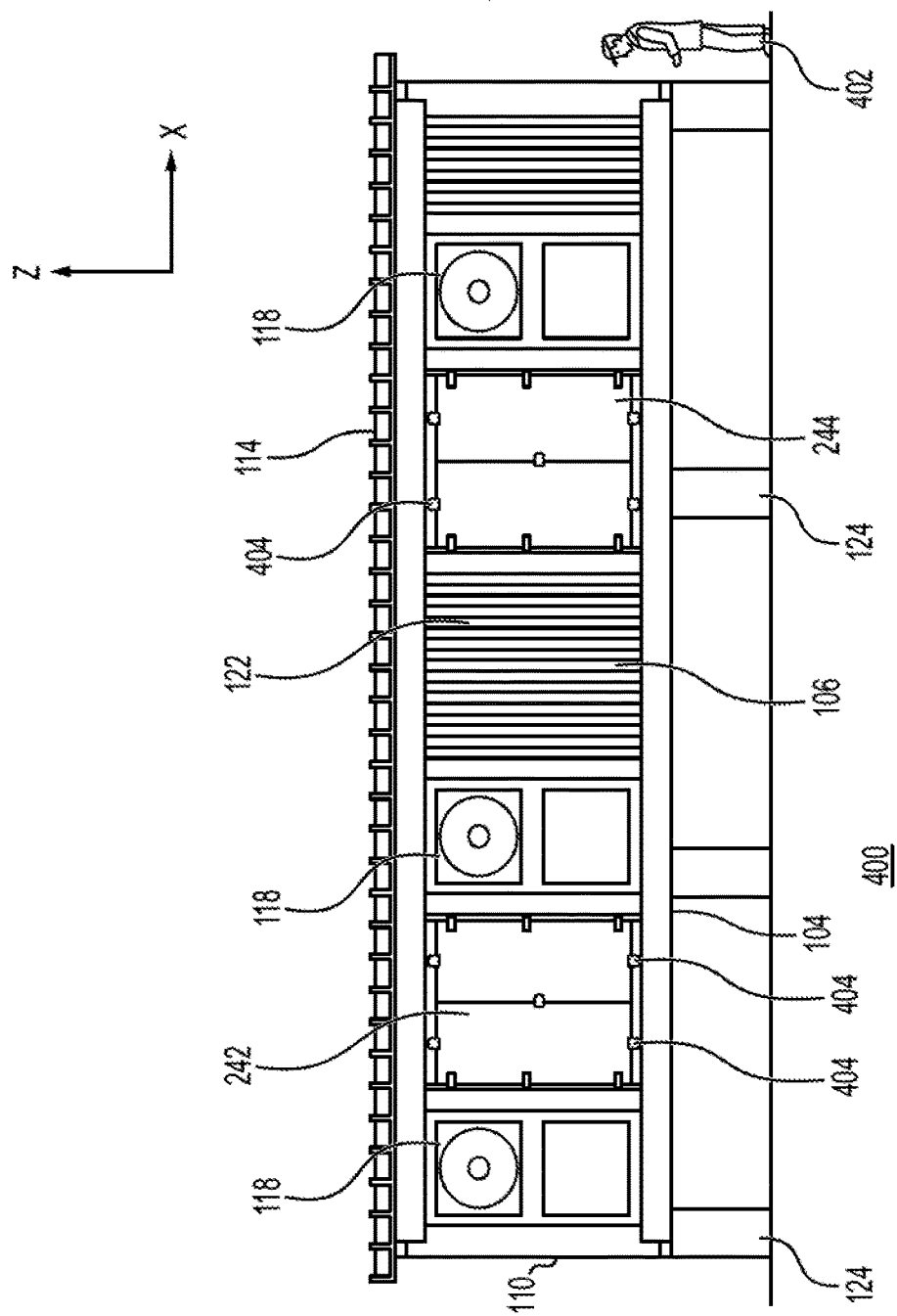
FIG. 4 is a front-side view of the portable electrical substation of FIG. 1 in accordance with an example of the present disclosure.

FIGS. 4 and 5 show a front-side view 400 and a right-side view 500 of substation 102A, respectively, from FIG. 1 in its deployed configuration. As discussed above, a series of piers 124 elevate substation 102A above the ground at a level to protect the structure from elements on the ground surface as well as to inhibit entry into substation 102A via end door 116, first side door 242, or second side door 244. In some examples, piers 124 lift base 104 above the ground at about one meter or more. At these heights, personnel, such as operator 402 in FIG. 4, may have to climb and crawl into substation 102A or employ a ladder or similar lift to enter. Therefore, while still enabling entry into substation 102A as needed for servicing, piers 124 provide a simple means for limiting access through the doors and increasing worker safety from accidental arcing.

As an additional safety feature, in some examples, end door 116, first side door 242, and second side door 244 may contain mechanical fixtures 404 and microswitches (not shown) configured to secure the doors in a closed position. The mechanical fixtures 404 may be bolts, locks, or similar devices arranged to prevent the opening of the doors and intended to be installed or activated when substation 102A is operating and presenting a risk of arcing to personnel. The microswitches may be installed between the doors and door frames of substation 102A and configured to open or close an electrical circuit upon opening of one of end door 116, first side door 242, and second side door 244. When opening of the doors occurs, the microswitches will trigger an alert or alarm to signal a breach of substation 102A. The alarm could be visual, audible, haptic, or a combination. Other arrangements for barring entry to substation 102A, such as motion sensors or infrared beams and sensors and the like, are also feasible and within the principles of the present disclosure.

While inhibiting access to substation 102A to heighten operator safety, substation 102A may include equipment for the operator to control or configure the substation, such as a workstation 502 (FIG. 2) within second end wall 112. In some examples, workstation 502 includes computer equipment with a touchscreen monitor for operator 402 to interact with. The workstation 502 may be mounted within second end wall 112 at a height above the ground around head level with an average person. By having the ability to monitor and control operation of substation 102A from workstation 502, operator 402 has a decreased need to enter substation 102A while the equipment is operating and presenting a risk of arcing.

Turning from the architecture of system 100 and substations 102 as illustrated in FIGS. 1-5, FIG. 6 is a flowchart of a representative 600 for assembling a portable electrical substation. This process 600 is illustrated as a logical flow graph, operation of which represents a sequence of operations that can be implemented manually or with moving equipment involving hardware, software, or a combination thereof. The order in which the operations are described is not intended to be construed as a limitation, and any number of the described operations may be combined in any order and/or in parallel to implement the process.

Figure 6:
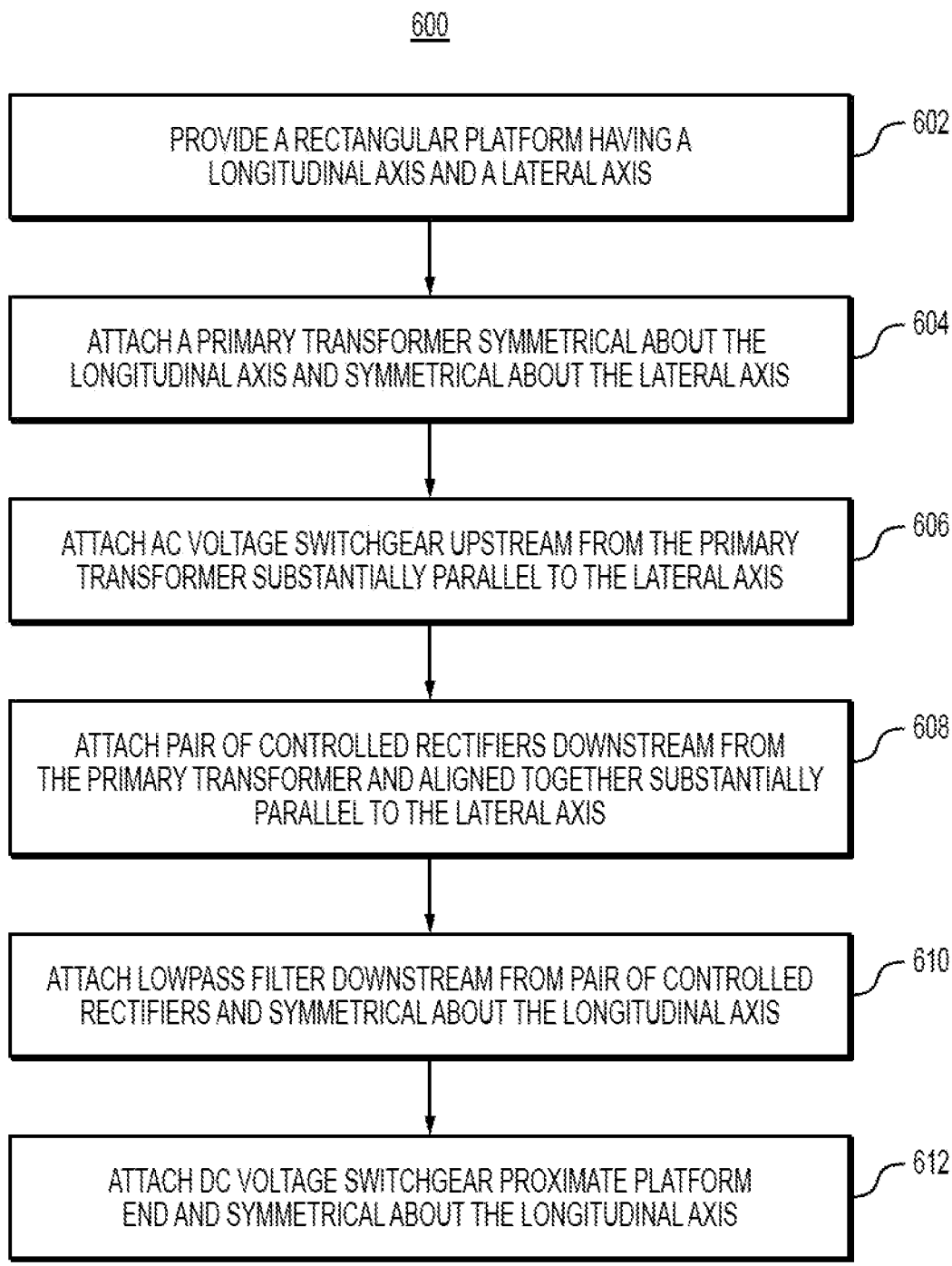
FIG. 6 is a flowchart depicting a method of assembling a portable electrical substation in accordance with an example of the present disclosure.

In FIG. 6, the example method 600, at step 602 includes providing a rectangular platform having a longitudinal axis and a lateral axis. As shown in examples within FIGS. 1-5, base 104 has top surface 210 on which a lateral axis A-A and a longitudinal axis B-B intersect at a center 212. The lateral axis A-A extends through center 212 between an upstream end 202 and a downstream end 204, while the longitudinal axis B-B passes through center 212 between a front side 206 and a rear side 208.

On the rectangular platform, electrical equipment for transforming AC electrical power to lower voltage DC electrical power is assembled. In particular, in a second step 604 of method 600, a primary transformer is attached to the rectangular platform symmetrical about the longitudinal axis and symmetrical about the lateral axis. In some examples, main transformer 214 is positioned about center 212, as illustrated in FIG. 2. In this arrangement, main transformer 214 is essentially equidistant between front side 206 and rear side 208 and equidistant between upstream end 202 and downstream end 204 within substation 102A.

Step 606 of the method of FIG. 6 involves attaching AC voltage switch gear upstream from the primary transformer and substantially parallel to the lateral axis. Thus, in relation to main transformer 214, AC switchgear 216 in FIG. 2 is located closer to upstream end 202. In some implementations, an auxiliary transformer 218 is also located upstream from main transformer 214 and aligned together and substantially parallel to the lateral axis A-A along with AC switchgear 216.

In step 608, a pair of control rectifiers, which convert AC voltage from the main transformer into DC voltage, are attached to the rectangular platform downstream from the primary transformer. Additionally, the pair of controlled rectifiers are aligned together substantially parallel to the lateral axis. Referring to FIG. 2 and the discussion above, first controlled rectifier 230 and second controlled rectifier 232 are positioned and attached on base 104 downstream from main transformer 214. The pair of controlled rectifiers are aligned together substantially parallel to lateral axis A-A and essentially equidistant between front side 206 and rear side 208.

In step 610, one or more lowpass filters are attached downstream from the pair of controlled rectifiers and positioned symmetrically about the longitudinal access. For instance, lowpass filters 234 may be located between the controlled rectifiers and downstream end 204, while being placed on longitudinal axis B-B to be essentially equidistant between front side 206 and rear side 208. In other examples, such as shown in FIG. 3, the one or more lowpass filters may be first lowpass filter 302 and second lowpass filter 304 positioned essentially parallel to lateral axis A-A immediately downstream from first controlled rectifier 230 and second controlled rectifier 232.

Final step 612 involves the attachment of DC voltage switchgear proximate to an end of the platform and symmetrical about the longitudinal axis. In one example, first DC switchgear 236 and second DC switchgear 238 are located adjacent downstream end 204 and on opposite sides of longitudinal axis B-B. Thus, first DC switchgear 236 and second DC switchgear 238 may be positioned on opposite sides of lowpass filters 234. In another example, the DC switchgear may be separated to handle separate paths from the controlled rectifiers and the lowpass filters, as shown in FIG. 3. In this situation, first positive DC switchgear 306 and first negative DC switchgear 308 are located on one side of base 104, such as closer to rear wall 108 than to front wall 106, while second positive DC switchgear 310 and second negative DC switchgear 312 are positioned closer to front wall 106 than to rear wall 108.

As discussed elsewhere in the present disclosure, following assembly of these electrical components on base 104 according to method 600, substation 102A may be lifted and inserted, or otherwise installed, into a shipping container configured to conform to a "high-cube" ISO shipping container for delivery to a destination. Therefore, substation 102A can be moved and shipped with balance and commissioned on site to provide high power density for an energy-delivery system to power high-voltage heavy work machines with minimal steps of assembly on-site.

Those of ordinary skill in the field will appreciate that the principles of this disclosure are not limited to the specific examples discussed or illustrated in the figures. For example, while particular voltage and power levels have been disclosed, the modular substations of the present disclosure are applicable to any variety of voltage and power levels required for an implementation. Also, it will be appreciated that the sequence of arranging and attaching components to a base of a substation may occur in any order convenient for the assembly. Moreover, while the present disclosure addresses a modular and scalable substation for providing DC power to a heavy work machine such as within a mine site, any electrical load using high-voltage DC power could benefit from the examples and techniques disclosed and claimed.

INDUSTRIAL APPLICABILITY

The present disclosure provides systems and methods for a scalable and modular substation to transfer electrical energy as DC voltage to a load on a conductive rail, such as a work machine at a mine site. Modular and scalable, the substation transforms AC voltage to DC voltage for driving a high-voltage and high-current DC load, such as a heavy work machine hauling loads within a mine site. Sized to fit within shipping container conforming to a standard high-cube ISO shipping container, the substation includes a main transformer attached at a center of a rectangular base with a pair of controlled rectifiers positioned on the base downstream from the main transformer, aligned parallel to a lateral axis of the base and substantially symmetrical to a longitudinal axis of the base. The arrangement of these components on the base along a longitudinal axis, together with lowpass filters and switchgear, achieves high power density for the substation, provides balanced mass for stability during shipment and placement, and helps protect personnel from accidental electrical arcing.

As noted above with respect to FIGS. 1-5, an example system for transferring electrical energy as a DC voltage includes a modular substation and a conductive rail. The modular substation 102A is configured to convert an AC voltage input to a DC voltage output and includes electrical equipment arranged on a rectangular base 104. In some examples, a main transformer 214 is positioned in a center of the base and AC switchgear 216 is attached to the base upstream from the main transformer, while a pair of controlled rectifiers are located downstream from the main transformer. A first controlled rectifier 230 and second controlled rectifier 232 are aligned substantially parallel to a lateral axis of base 104 and essentially equidistant between sides of base 104. Lowpass filters and DC switchgear are also balanced between the sides of base 104 symmetrical with a longitudinal axis of base 104 downstream from the controlled rectifiers. As arranged on base 104, and as selected for electrical performance with high efficiency and low thermal output, the electrical equipment achieves high power density for substation 102A and enables the substation to fit within a shipping container conforming dimensionally to a standard high-cube ISO shipping container. Moreover, the placement of equipment balances the mass in the substation, ensuring stability during shipment and placement.

In the examples of the present disclosure, substations 102 together with conduction rails 140 provide a modular and scalable system 100 for distributing DC voltage to a high voltage and high current load, such as a heavy work machine. The arrangement of electrical components, particularly main transformer 214, first controlled rectifier 230, and second controlled rectifier 232, symmetrical to the longitudinal axis B-B permits use of shorter parallel conductors within cabling 240 and helps avoid difficult cable runs and possible parasitic events. The compact form-factor and modular design allow for ease of transportation to a worksite and rapid deployment compared to conventional designs that require worksite assembly. This leads to greater efficiency and resource utilization at the worksite. Additional features such as decreased walking space on base 104, piers 124 for elevating the substation above a step level, and mechanical fixtures 404 and microswitch sensors on doors all combine to increase safety for personnel from electrical arcing that could otherwise occur with operators inside substation 102A during high-voltage operation.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A: B: C: A and B: A and C: B and C: A, B, and C: or multiple of any item such as A and A: B, B, and C: A, A, B, C, and C; etc.

Terms of approximation are meant to include ranges of values that do not change the function or result of the disclosed structure or process. For instance, the term "about" generally refers to a range of numeric values that one of skill in the art would consider equivalent to the recited numeric value or having the same function or result. Similarly, the antecedent "substantially" means largely, but not wholly, the same form, manner or degree, and the particular element will have a range of configurations as a person of ordinary skill in the art would consider as having the same function or result. As an example, "substantially planar" need not be exactly flat but may also encompass slight variations of a few degrees based on the context.

While aspects of the present disclosure have been particularly shown and described with reference to the embodiments above, it will be understood by those skilled in the art that various additional embodiments may be contemplated by the modification of the disclosed systems and methods without departing from the spirit and scope of what is disclosed. Such embodiments should be understood to fall within the scope of the present disclosure as determined based upon the claims and any equivalents thereof.

What is claimed is:

1. A system for transferring electrical energy as DC voltage, comprising:
   a modular substation configured to receive an AC voltage input and to deliver a DC voltage output, the modular substation comprising:
      a base having a substantially planar and rectangular shape, the base comprising:
         a top surface extending longitudinally from a first end to a second end and laterally from a front side to a rear side,
         a longitudinal axis along the top surface substantially centered between the front side and the rear side, and
         a lateral axis along the top surface substantially centered between the first end and the second end,
      AC voltage switchgear configured to receive the AC voltage input from an external source,
      an auxiliary transformer configured to be electrically coupled to the AC voltage switchgear, the auxiliary transformer and the AC voltage switchgear being aligned on the top surface of the base substantially parallel to the lateral axis and between the lateral axis and the first end,
      a main transformer having primary windings and secondary windings, the primary windings being electrically coupled to the AC voltage switchgear, the main transformer being positioned on the top surface of the base substantially at an intersection of the longitudinal axis and the lateral axis,
      a pair of controlled rectifiers electrically coupled to at least the secondary windings of the main transformer and configured to generate the DC voltage output, the pair of controlled rectifiers being aligned on the top surface of the base substantially parallel to the lateral axis and between the main transformer and the second end,
      one or more lowpass filters electrically coupled to the pair of controlled rectifiers, the one or more lowpass filters being positioned substantially parallel to the lateral axis and symmetrical about the longitudinal axis between the pair of controlled rectifiers and the second end, and
      DC voltage switchgear electrically coupled to the one or more lowpass filters and configured to receive the DC voltage output from the one or more lowpass filters, the DC voltage switchgear being positioned proximate to the second end of the base, substantially parallel to the lateral axis, and symmetrical about the longitudinal axis; and
   a conductive rail, electrically coupled to the DC voltage switchgear, configured to transfer the DC voltage output to a load connected to the conductive rail.

2. The system of claim 1, further comprising:
   a first pair of air-conditioning units respectively positioned proximate the front side and the rear side and between the lateral axis and the first end; and
   a second air-conditioning units respectively positioned proximate the front side and the rear side and between the lateral axis and the second end.

3. The system of claim 1, further comprising: piers, positioned between the base and a ground and structured to provide vertical support to the modular substation, the piers being configured to elevate the base to a height of at least one meter above the ground.

4. The system of claim 1, wherein the modular substation further comprises:
   walls rising vertically above the first end, the second end, front side, and the rear side, respectively, of the base;
   at least one door within one of the walls, the at least one door containing a mechanical fixture configured to selectively secure the at least one door in a closed position; and
   a microswitch attached to the at least one door, the microswitch configured to generate a signal indicating movement of the at least one door from the closed position.

5. The system of claim 1, wherein the AC voltage input is at least 11 kV three-phase AC and the DC voltage output is at least +/−1.1 kV DC.

6. The system of claim 1, wherein the modular substation includes an end wall rising from the second end of the base, the end wall including a workstation for an operator standing external to the modular substation to control the modular substation.

7. A portable electrical substation, comprising:
a rectangular platform having a top surface, the top surface having a geometric center between an upstream end and a downstream end and between a first side and a second side, wherein a longitudinal axis passes through the geometric center and along the top surface substantially parallel to the first side and the second side, wherein a lateral axis passes through the geometric center and along the top surface substantially parallel to the upstream end and the downstream end;
a primary high-voltage transformer attached to the top surface symmetrical about the longitudinal axis and symmetrical about the lateral axis;
AC voltage switchgear attached to the top surface upstream from the primary high-voltage transformer and substantially parallel to the lateral axis;
a pair of controlled rectifiers attached to the top surface downstream from the primary high-voltage transformer and aligned together substantially parallel to the lateral axis;
one or more lowpass filters attached to the top surface downstream from the pair of controlled rectifiers and symmetrical about the longitudinal axis; and
DC voltage switchgear attached to the top surface proximate the downstream end, substantially parallel to the lateral axis, and symmetrical about the longitudinal axis.

8. The portable electrical substation of claim 7, further comprising:
an auxiliary high-voltage transformer attached to the top surface upstream from the primary high-voltage transformer, the auxiliary high-voltage transformer being aligned with the AC voltage switchgear substantially parallel to the lateral axis.

9. The portable electrical substation of claim 7, wherein the pair of controlled rectifiers are symmetrical about the longitudinal axis.

10. The portable electrical substation of claim 7, wherein the one or more lowpass filters and the DC voltage switchgear are aligned together substantially parallel to the lateral axis.

11. The portable electrical substation of claim 7, wherein the DC voltage switchgear is downstream from the one or more lowpass filters.

12. The portable electrical substation of claim 7, further comprising:
first pair of air-conditioning units respectively positioned proximate the first side and the second side and between the lateral axis and the upstream end; and
second air-conditioning units respectively positioned proximate the first side and the second side and between the lateral axis and the downstream end.

13. The portable electrical substation of claim 7, further comprising:
walls rising vertically above the upstream end, the downstream end, first side, and the second side, respectively, of the rectangular platform;
at least one door within one of the walls, the at least one door containing a mechanical fixture configured to selectively secure the at least one door in a closed position; and
a microswitch attached to the at least one door, the microswitch configured to generate a signal indicating movement of the at least one door from the closed position.

14. The portable electrical substation of claim 7, further comprising:
walls rising vertically above the upstream end, the downstream end, first side, and the second side, respectively, of the rectangular platform, wherein the portable electrical substation fits within a standard intermodal high-cube shipping container according to ISO 668:2020 Series 1AAA.

15. A method of assembling a portable electrical substation, comprising:
providing a rectangular platform having a geometric center between an upstream end and a downstream end and between a first side and a second side, wherein a longitudinal axis passes through the geometric center and substantially parallel to the first side and the second side, wherein a lateral axis passes through the geometric center and substantially parallel to the upstream end and the downstream end; and
assembling electrical equipment for converting AC power to lower voltage DC power onto the rectangular platform, the assembling comprising, in any order:
attaching a primary high-voltage transformer symmetrical about the longitudinal axis and symmetrical about the lateral axis,
attaching AC voltage switchgear upstream from the primary high-voltage transformer substantially parallel to the lateral axis,
attaching a pair of controlled rectifiers downstream from the primary high-voltage transformer, the pair of controlled rectifiers being aligned together substantially parallel to the lateral axis,
attaching one or more lowpass filters downstream from the pair of controlled rectifiers and symmetrical about the longitudinal axis, and
attaching DC voltage switchgear proximate the downstream end, substantially parallel to the lateral axis, and symmetrical about the longitudinal axis.

16. The method of claim 15, further comprising:
attaching an auxiliary transformer upstream from the primary high-voltage transformer, the auxiliary transformer and the AC voltage switchgear being aligned together substantially parallel to the lateral axis.

17. The method of claim 15, further comprising:
placing the rectangular platform into a shipping container complying with ISO 668:2020 Series 1AAA.

18. The method of claim 15, wherein attaching the pair of controlled rectifiers further comprises:
positioning the pair of controlled rectifiers to be symmetrical about the longitudinal axis.

19. The method of claim 15, further comprising, before attaching the one or more lowpass filters:
aligning together the one or more lowpass filters and the DC voltage switchgear substantially parallel to the lateral axis.

20. The method of claim 15, wherein the one or more lowpass filters comprise a first lowpass filter and second lowpass filter, the method further comprising, before attaching the one or more lowpass filters:
positioning the first lowpass filter downstream from one of the pair of controlled rectifiers;
positioning the second lowpass filter downstream from another of the pair of controlled rectifiers; and
aligning the one or more lowpass filters substantially parallel to the lateral axis.

* * * * *